(12) United States Patent
Dubois et al.

(10) Patent No.: US 9,654,567 B2
(45) Date of Patent: *May 16, 2017

(54) MACHINE-TO-MACHINE SERVICE BASED ON COMMON DATA FORMAT

(71) Applicants: Verizon Patent and Licensing Inc., Basking Ridge, NJ (US); Cellco Partnership, Basking Ridge, NJ (US)

(72) Inventors: Jean F. Dubois, Boothbay Harbor, ME (US); Lily Zhu, Parsippany, NJ (US); Patrick J. Moran, Shrewsbury, MA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,842

(22) Filed: Mar. 30, 2016

(65) Prior Publication Data

US 2016/0212218 A1 Jul. 21, 2016

Related U.S. Application Data

(63) Continuation of application No. 14/142,083, filed on Dec. 27, 2013, now Pat. No. 9,380,060.

(51) Int. Cl.
*H04L 29/08* (2006.01)
*H04L 29/06* (2006.01)

(52) U.S. Cl.
CPC ........ *H04L 67/141* (2013.01); *H04L 63/0407* (2013.01); *H04L 63/0428* (2013.01); *H04L 63/0876* (2013.01); *H04L 63/10* (2013.01); *H04L 67/1095* (2013.01); *H04L 67/12* (2013.01); *H04L 67/2804* (2013.01); *H04L 67/2823* (2013.01)

(58) Field of Classification Search
CPC .............. H04L 67/141; H04L 63/0876; H04L 67/2823; H04L 67/2804; H04L 67/1095
See application file for complete search history.

(56) References Cited

U.S. PATENT DOCUMENTS

| | | | |
|---|---|---|---|
| 9,380,060 B2 * | 6/2016 | Dubois | ............... H04L 63/0876 |
| 2010/0049701 A1 * | 2/2010 | Miller | ............... G06F 17/30569 |
| | | | 715/236 |
| 2013/0254416 A1 * | 9/2013 | Abraham | ............ H04L 67/2823 |
| | | | 709/230 |
| 2014/0229421 A1 * | 8/2014 | Thomas | ............... G06N 99/005 |
| | | | 706/59 |

* cited by examiner

*Primary Examiner* — Kim T Nguyen

(57) ABSTRACT

A method, a device, and a non-transitory storage medium having instructions to establish a connection with a sensor device; receive sensor data from the sensor device via the connection; convert the sensor data into common data of a common data format, wherein the common data includes metadata that supports an ontology; store the common data; and transmit the common data to a network device of a network.

20 Claims, 12 Drawing Sheets

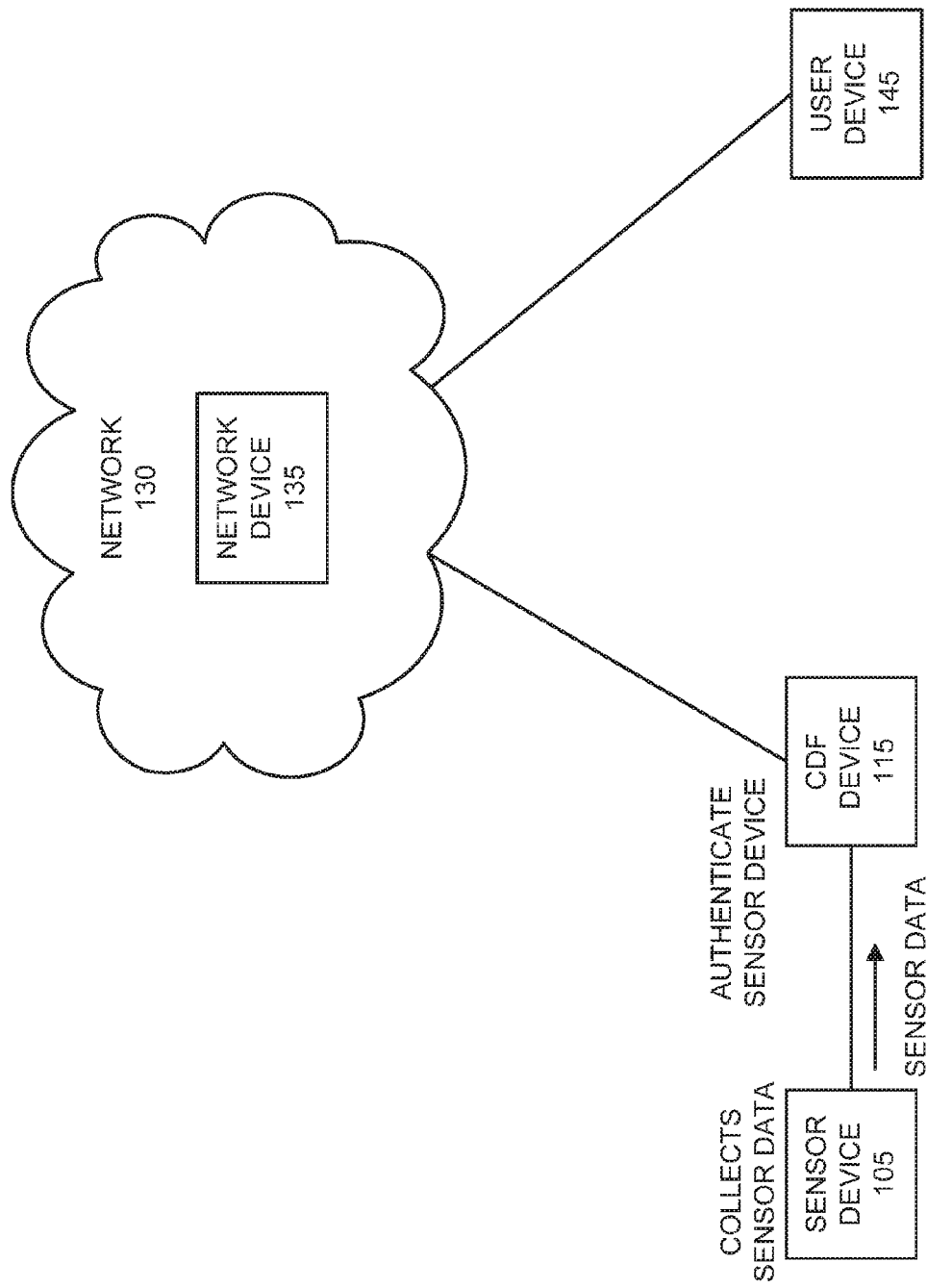

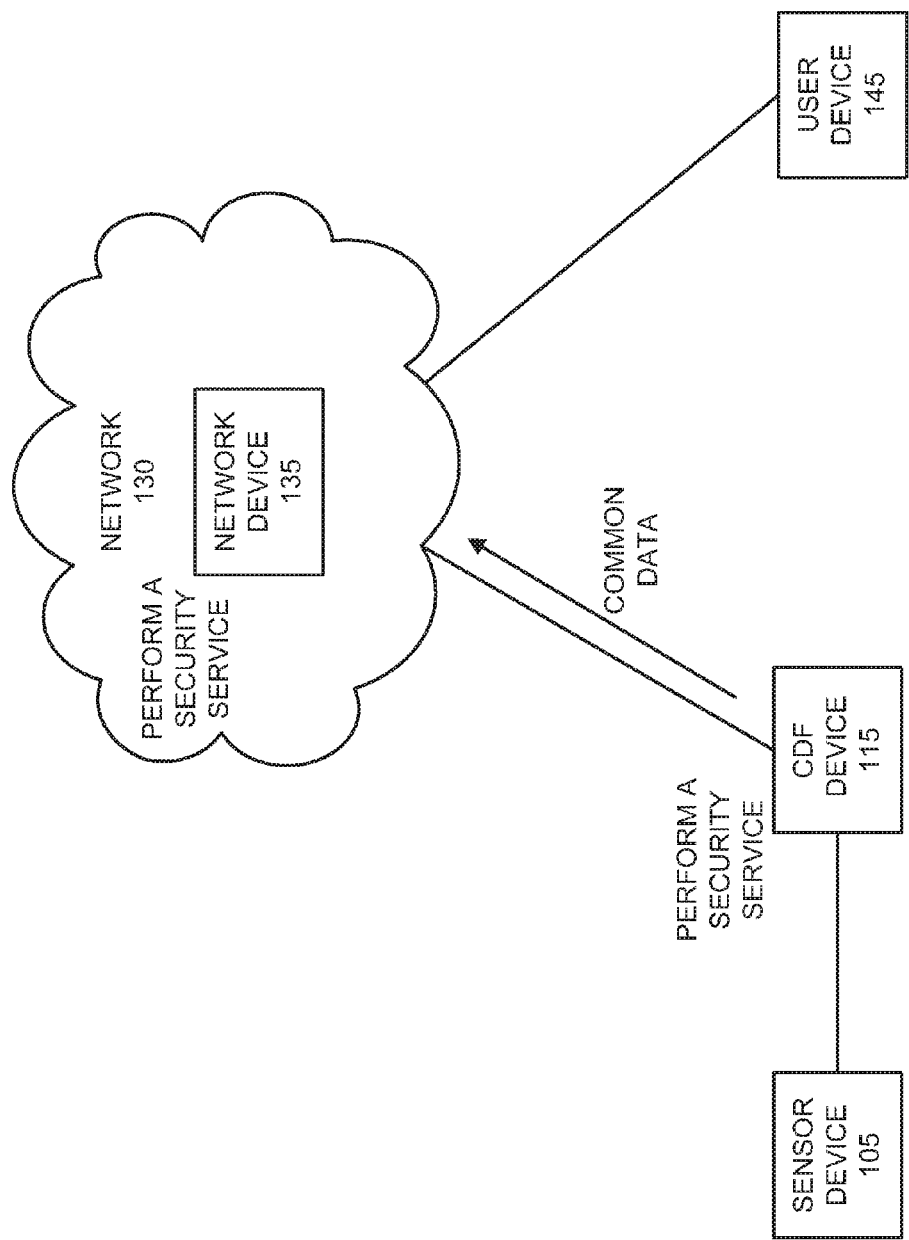

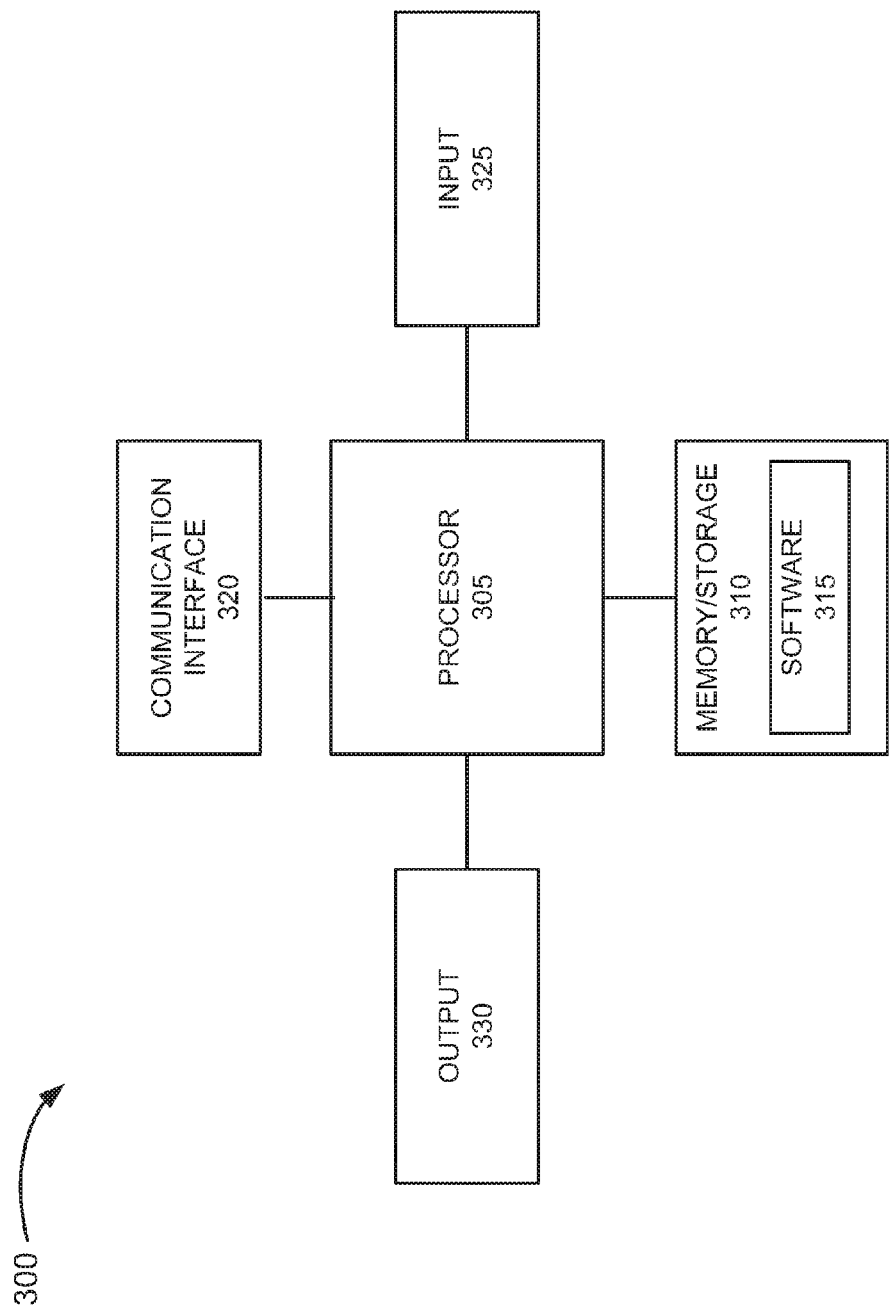

MACHINE-TO-MACHINE SERVICE BASED ON COMMON DATA FORMAT

CROSS REFERENCE TO RELATED APPLICATION

This application is a continuation of U.S. patent application Ser. No. 14/142,083 filed on Dec. 27, 2013, the disclosure of which is incorporated herein by reference in its entirety.

BACKGROUND

Machine-to-Machine (M2M) communication has expanded to a variety of applications, such as utilities, vending machines, point of sales terminals, transport and logistics, healthcare, security, financial services, etc. A machine-to-machine communication may traverse a variety of networks operating according to different standards to provide a communication link between devices.

BRIEF DESCRIPTION OF THE DRAWINGS

FIGS. 2A-2E are diagrams that illustrate exemplary processes pertaining to the machine-to-machine service based on the common data format;

FIG. 3 is a diagram illustrating exemplary components of a device that may correspond to one or more of the devices in the exemplary environment;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "machine-to-machine" communications, as used herein, is intended to be broadly interpreted to include communication between two or more devices. Additionally, it is intended that other terms and their meanings, such as, for example, device-to-device (D2D) communications, and/ or telemetry, are incorporated into the term machine-to-machine communications. A machine-to-machine communication may occur via a wireless connection and/or a wired connection.

The breadth of applications pertaining to M2M communications continues. As a natural consequence, the M2M arena has given way to a variety of vendor specific data formats. For example, in the area of pedometers, various vendors (e.g., Fitbit, Nike, Bodymedia, etc.) each use their own data format. Additionally, the use of simple sensors to gather data for an M2M communication is commonplace. While each of these data formats is sufficient within the scope of their application, as a collective, the individual data format lacks the ability to aggregate and augment their measurement across a larger application space. While this shortcoming may stem from reserving battery life and managing cost, the use of simple sensors limit the type of data acquired. For example, a simple sensor may acquire a very limited amount/type of data without acquiring context data (e.g., location, etc.) and/or performing primitive logical functions (e.g., comparing recent data to a threshold, etc.).

In addition to the drawbacks mentioned above, M2M infrastructures can be susceptible to acquiring redundant data, which in turn, can unnecessarily waste resources and also increase the cost of the M2M infrastructure to support the transport and storage of data, etc. Additionally, typically, M2M communications lack data security. For example, a sensor may transmit data to another device in which the data is not encrypted nor is session connectivity secured.

Figure 1:
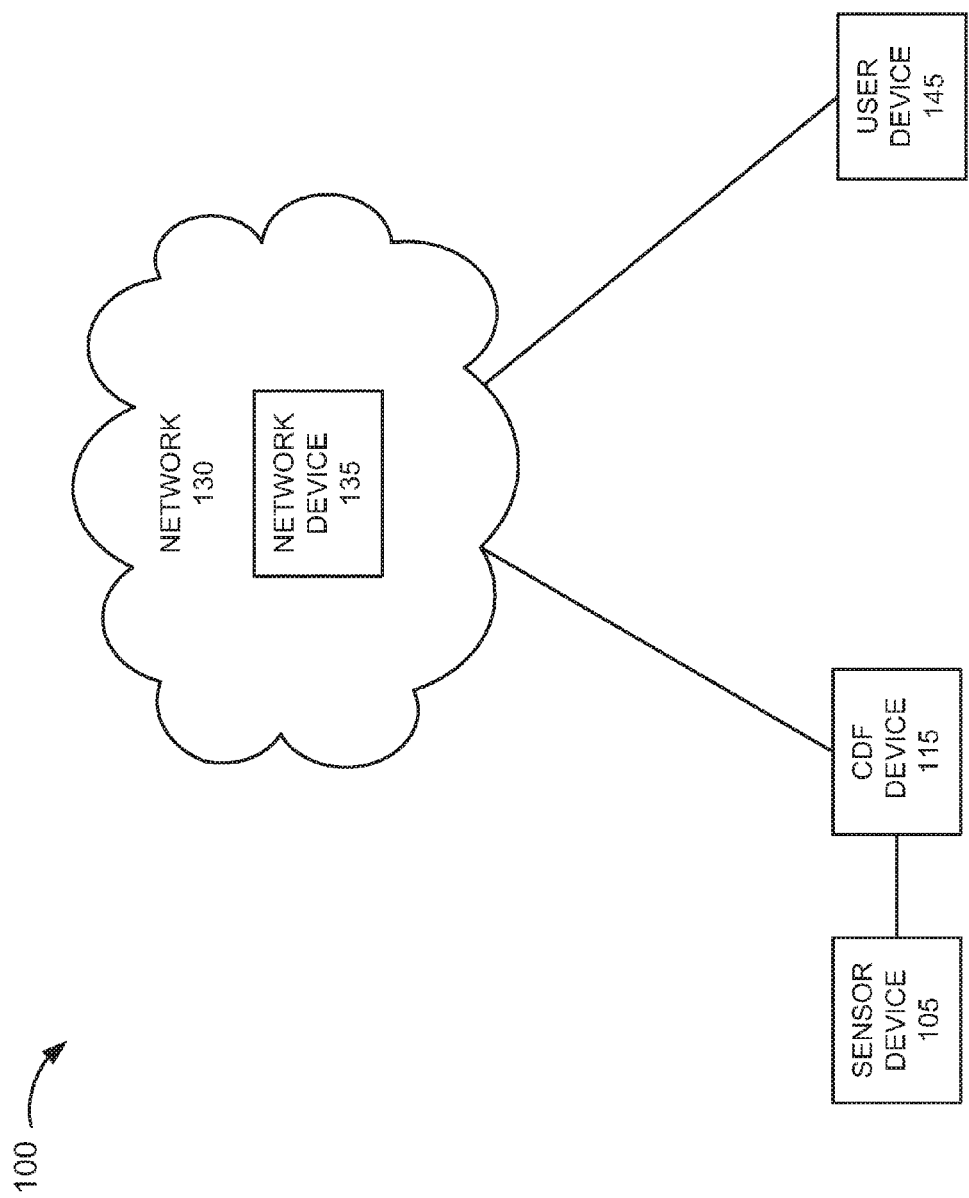
FIG. 1 is a diagram illustrating an exemplary environment in which exemplary embodiments of a machine-to-machine service based on a common data format may be implemented.

FIG. 1 is a diagram illustrating an exemplary environment 100 in which exemplary embodiments may be implemented. As illustrated, environment 100 includes a sensor device 105 and a common data format (CDF) device 115. Additionally, environment 100 includes a network 130 and a network device 135. As further illustrated, environment 100 includes a user device 145.

Environment 100 may be implemented to include wired, optical, and/or wireless connections among the devices and the network illustrated. A connection may be direct or indirect and may involve an intermediary device and/or an intermediary network not illustrated in FIG. 1. Additionally, the number and the arrangement of connections between the devices and the network of environment 100 are exemplary.

The number of devices and networks, and the configuration in environment 100 are exemplary. According to other embodiments, environment 100 may include additional devices, different devices, and/or differently arranged devices, than those illustrated in FIG. 1. For example, a single device (e.g., network device 135) in FIG. 1 may be implemented as multiple devices and/or multiple single devices (e.g., sensor device 105 and CDF 115 device) may be combined into a single device. Additionally, or alternatively, environment 100 may include an additional network and/or a differently arranged network than that illustrated in FIG. 1.

A device (e.g., common data format device 115, network device 135, and user device 145) may be implemented according to one or multiple network architectures (e.g., a client device, a server device, a peer device, a proxy device, and/or a cloud device). A device may be implemented according to a centralized computing architecture, a distributed computing architecture, or a cloud computing architecture. Also, according to other embodiments, one or more functions and/or processes described as being performed by a particular device may be performed by a different device, or some combination of devices.

Sensor device 105 includes a device that detects an input or an event from the physical environment. Sensor device 105 may generate data pertaining to one of many application areas, such as environmental, medical, security, transportation, energy, automation, military, etc. Sensor device 105 may be mobile, stationary, battery-powered, line-powered, an electronic sensor, a biosensor, a chemical sensor, a mechanical sensor, etc. According to an exemplary implementation, sensor device 105 is a "simple" or "dumb" sensor with little, if any, intelligence other than to generate data in response to the input and transmit the data. Sensor device

105 may generate data of a proprietary format. Sensor device 105 communicates the data to common data format device 115.

Common data format device 115 includes a device that receives data from sensor device 105. According to an exemplary embodiment, common data format device 115 authenticates sensor device 105. For example, common data format device 115 authenticates based on a network address or other identifier associated with sensor device 105 and included with a transmission from sensor device 105. According to an exemplary embodiment, common data format device 115 includes a policy engine. The policy engine uses policies to perform various functions. For example, the policy engine may govern the logic of common data format device 115 as to whether to perform or not perform a function, and how to perform a function. By way of example, the policy engine may invoke policies pertaining to the filtering of sensor data, the prioritizing of sensor data, authenticating sensor devices 105, etc. The policy engine may also prescribe a rule set that enforces a globally irrefutable signature that enables the traceability and authenticity of the sensor data (e.g., by way of a one-way hash, such as a Merkle Tree hash). This signature enforcement ensures that data acquired by a variety of sensors is only admitted to the larger pool of collected data once its provenance is provable. The method of maintaining and validating the signatures is encapsulated within common data format device 115. From time to time the method and mechanism of enforcing traceability and authenticity/data integrity may be changed by use of the policy engine.

According to an exemplary embodiment, common data format device 115 converts sensor data (e.g., of a proprietary data format) received from sensor device 105 to another data format defined by a schema. By way of example, the schema for a sensor may include a sensor identifier, a sensor type, and measurement properties. The measurement properties may include granularity, value, and unit. Common data format device 115 may convert raw sensor data received from sensor device 105 to schema data defined by the schema. According to an exemplary implementation, the schema is an Extensible Markup Language (XML) schema. According to another implementation, document type definitions (DTDs) and/or other suitable data representation formats may be used. In addition the data format may be represented in an Abstract Syntax Notation (ASN.1) for example.

According to an exemplary embodiment, common data format device 115 transforms the schema data into a common data format. For example, common data format device 115 stores an ontology. Common data format device 115 transforms the schema data into common data of the common data format by adding metadata to the schema data. The metadata supports an ontology representation. According to an exemplary implementation, the ontology is represented using Resource Description Format (RDF) and Web Ontology Language (OWL). For example, the RDF defines a triple (e.g., subject, predicate, and object) according to an RDF schema. The RDF data may be annotated with semantic metadata using OWL.

The schema data may be metadata-tagged with user-configurable fields. For example, the metadata may include metadata pertaining to who, what, where, when, why, etc. By way of further example, the metadata may include context information (e.g., date and timestamps, location, owner of sensor device 115, object type from where the data was acquired (e.g., a cooling tower, etc.), etc.) and/or other types of metadata (e.g., validity, regulation indicator, vertical type, etc.) that supports an objective to its use. Common data format device 115 may obtain an instance of metadata internally or from another device (e.g., a time server, a third party device, etc.). According to an exemplary embodiment, common data format device 115 may reformat sensor data. For example, assume the sensor device 105 includes a video camera. Common data format device 115 may reformat a video stream to an Archive Exchange Format (AXF) or an MPEG format. The reformatted video stream may be metadata-tagged.

According to an exemplary embodiment, common data format device 115 includes a pre-analytics service. The pre-analytics service may be application-specific. By way of example, assume that sensor data includes a video stream pertaining to a security service. The pre-analytics service of common data format device 115 may perform a video frame comparison to identify an individual. According to other examples, the pre-analytics service may generate an alarm if a threshold is reached, transmit an emergency message at a time other than during a scheduled transfer, audit or triage sensor data (e.g., identify unusual data, validate trustworthiness, etc), etc. In this regard, common data format device 115 includes a local intelligence (relative to sensor device 105) to process and use the sensor data. The pre-analytics service may be configured to use any instance of data (e.g., sensor data, schema data, and/or common data).

In contradistinction to well-known M2M communication systems, which typically provide decision-making services after sensor data is uploaded to a central repository in a network, common data format device 115 can provide (near) real-time analysis, search, use, etc., of the common data, as well as transform the sensor data into a common data format that is conducive to a user-configurable objective associated with the M2M communication system. Additionally, the common data format provides a data abstraction, supports an interface specification for data manipulation based on the metadata, and allows for higher level data application development (e.g., pre-analytics, analytics, application enablement platforms, fast queries, etc.). In view of this functionality, goals may be achieved more readily. For example, according to the use case of the video camera at a retail location, the initial ontology of the camera may be tagged by means of the common data format device 115 to describe a security application. However this camera may also have a field of view of the weather or the retail inventory. In such cases, it is possible to tag the data at the source to not only sound an alarm via a security application but also to provide a notification when the weather changes or when an inventory changes. Under existing approaches, where the data is streamed or processed prior to transmission without a common data format tag, there is no opportunity to utilize additional data from the sensor without transmitting all the information to a central collector (e.g., a cloud network). In contrast, given the capabilities of common data format device 115, a schema and ontology of an application (e.g., a weather application, a retail inventory application, etc.) can be configured on common data format device 115 so that data compression and local processing of the video stream can performed to allow for the detection of events that pertain to the given application space (i.e., the weather application, the retail inventory application, etc.). Thus, for example, when an inventory application is configured (e.g., to detect stolen merchandise), then a user can directly request a certain type of data from common data format device 115, which stores sensor data wrapped with the inventory ontology, without having to sort through vast amounts of unrelated data. Additionally, since common data format device 115 may be configured with the inventory application, as well as generating sensor data wrapped with the inventory ontology, the user does not need to add additional sensors specifically for inventory management. Furthermore when the security camera is shut down for maintenance or other reason (e.g., nefarious act, etc.), for example, common data format device 115 may recognize the disruption of the sensor feed and can notify multiple applications (e.g., in network 130) in real time such as the security service, the weather service, as well as the inventory management service. In certain situations, the disruption of the continuity of a sensor feed is important to ascertain the integrity of the overall application/sensor data. Common data format device 115 may generate data indicating the disruption and/or generate and transmit alarms to appropriate users and/or other network devices.

According to an exemplary embodiment, common data format device 115 provides a security service. The security service may pertain to data, communications, and/or access to common data format device 115. For example, the security service may provide encryption, decryption, compression, decompression, data integrity checking, authentication, authorization, establishment and maintenance of secure sessions, etc. For example, assume common data format device 115 obtains healthcare-related common data. The security service of common data format device 115 may encrypt the health-related common data and establish a secured virtual private network (VPN) connection/session with network device 135 to transmit the health-related common data. Further, because the common data format allows the early association of many sensors, a video camera may be used in conjunction with a blood pressure monitor to provide multiple mechanisms of authentication of the patient. These multiple sensors may be used to form a unique signature of the data before it is collected in a central repository.

According to an exemplary embodiment, common data format device 115 stores common data/sensor data (i.e., common data and/or sensor data). For example, common data format device 115 may store a database of common data/sensor data. The common data/sensor data stored locally allows common data format device 115 to perform pre-analytic services and/or other intelligent processing pertaining to historical common data, etc.

Additionally, in view of the common data format, there exists a data consistency between the common data stored by common data format device 115 and the common data stored by network device 135 in network 130. As a result of this consistency, applications, whether located locally or in network 130, may offer users and devices advantages over existing systems in terms of data processing, analytics, etc., as well as on-boarding new customers, application development based on the common data format, etc.

According to an exemplary embodiment, the common data format device 115 is implemented as a network device. For example, common data format device 115 may be implemented as a gateway device. Common data format device 115 may reside in close proximity to sensor device 105. For example, assume sensor device 105 includes a vibrometer and is located on a bridge for measuring vibrations. Common data format device 115 may also reside on the bridge. According to another exemplary embodiment, the common data format device 115 is implemented as a user device (e.g., a mobile device). For example, assume sensor device 105 includes a biosensor that measures insulin or glucose levels of a person. The person may carry a smartphone that provides the functionality of common data format device 115, as described herein. According to another exemplary embodiment, the user device includes sensor device 105 and common data format 115.

According to an exemplary embodiment, a device (e.g., a network device or a user device) may include the functionality of both sensor device 105 and common data device 115.

Network 130 includes a network that provides access to an M2M service. The M2M service is based on the common data format, as described herein. Network 130 may be implemented to include a public network, a private network, a wired network, a wireless network, an Internet Protocol (IP) network, and/or other suitable type of network.

Network device 135 includes a network device that provides the M2M service. The M2M service includes the common data format, as previously described. Among other things, the common data format allows the M2M service to extend to the edge of the M2M network by providing multiple complimentary functions within a single sensor type. For example, a security camera may be used to measure weather, account for inventory, enhance guest services, or other types of M2M services. During the lifetime of the sensor, the ontology of the sensor and its associated M2M services may change but may be maintained by pairing the M2M service with the common data format and common data format device 115. Additionally, in existing M2M systems, a sensor device may be limited to what M2M service the sensor device can provide based on the capabilities of the supporting network. For example, according to one use, a video camera may be able to transmit, via a supporting network, difference frames relative to a video feed, which require a low bandwidth. However, the video camera may not be able to transmit, via the supporting network, a continuous video feed (e.g., such as in security service) because the bandwidth requirements of the supporting network are insufficient. According to an exemplary embodiment, an administrator may configure common data format device 115 to compress and/or reduce the amount of bandwidth needed to transport the continuous video feed to network 130, and in turn, provide another M2M service, without deploying additional sensor devices and/or adding new links having higher bandwidth capacities.

Additionally, the M2M service includes other services, as described herein. According to an exemplary embodiment, network device 135 includes a security service. The security service may pertain to data, communications, and/or access to network device 135. For example, network device 135 may authenticate and/or authorize sensor device 105, common data format device 115, and users of the M2M service. The security service may also include the establishment and maintenance of secure sessions with other devices (e.g., common data format device 115, user device 145), data integrity checking, compression, decompression, encryption, decryption, encryption, with respect to common data and other types of data. According to an exemplary embodiment, network device 135 includes a storage service that stores the common data. The storage service may store other types of data (e.g., proprietary data, sensor data, reports, etc.). According to exemplary implementation, the storage service uses a database to store common data and any other types of data.

According to an exemplary embodiment, network device 135 includes an application that provides data processing and analytics services. For example, network device 135 allows for access to the common data, allows for browsing, searching/querying of common data, data processing (e.g., modify data, classify data, etc.), and data analytics (e.g., interpret sensed data, common data, generate reports, etc.). Network device 135 may also provide a portal service that allows users to access and configure common data format device 115. For example, the configuration of common data format device 115 may include configuring the policies, configuring the agent, ontology, etc. The portal service may also allow users to access, process and/or analyze the stored data by third party applications. For example, an owner, a business, a company, etc., of sensor devices 105 may have a proprietary application or a commercially available application that allows the owner, business, company, etc., to obtain, process, and/or analyze the stored data. Additionally, as previously explained, network device 135 may offer an application service that allows users to obtain, review, process, analyze, etc., common data, etc., generate reports, etc.

User device 145 includes an end user device that allows a user access to the M2M service. User device 145 may be implemented to include a smartphone, a tablet device, a netbook, a computer, or some other type of communicative device. According to an exemplary embodiment, user device 145 is capable of connecting to network device 135 via network 130. User device 145 may include common data format device 115 and/or sensor device 105.

The M2M service based on the common data format is described further below in view of exemplary implementations of the embodiments described herein. FIGS. 2A-2E are diagrams that illustrate exemplary processes pertaining to the machine-to-machine service based on the common data format.

Referring to FIG. 2A, according to an exemplary scenario illustrative of an exemplary embodiment of the M2M service that includes the common data format, assume sensor device 105 collects sensor data. In response to collecting the sensor data, sensor device 105 initiates a communication with common data format device 115 to transmit the sensor data. According to this example, assume common data format device 115 and sensor device 105 are a part of a local area network (LAN). Common data format device 115 authenticates sensor device 105 based on a sensor identifier (e.g., a MAC address or other unique identifier). Upon successfully authenticating sensor device 105, common data format device 115 receives the sensor data from sensor device 105 and stores the sensor data (e.g., in a database). Common data format device 115 may perform a data integrity check when storing the sensor data. The data integrity check may contain ontological based checkpoints that are specific to the M2M service being offered. For example, a camera sensing the weather might have a geo-location and time of year metadata tag such that the detection of snow in July in Boston is not within the acceptable limits of the data store. This out-of-bound data might be flagged for special treatment within the M2M system. For example, a pre-analytics service of common data format device 115 may detect out-of-bound data values relative to a pre-determined range of acceptable sensor data values.

Figure 2B:
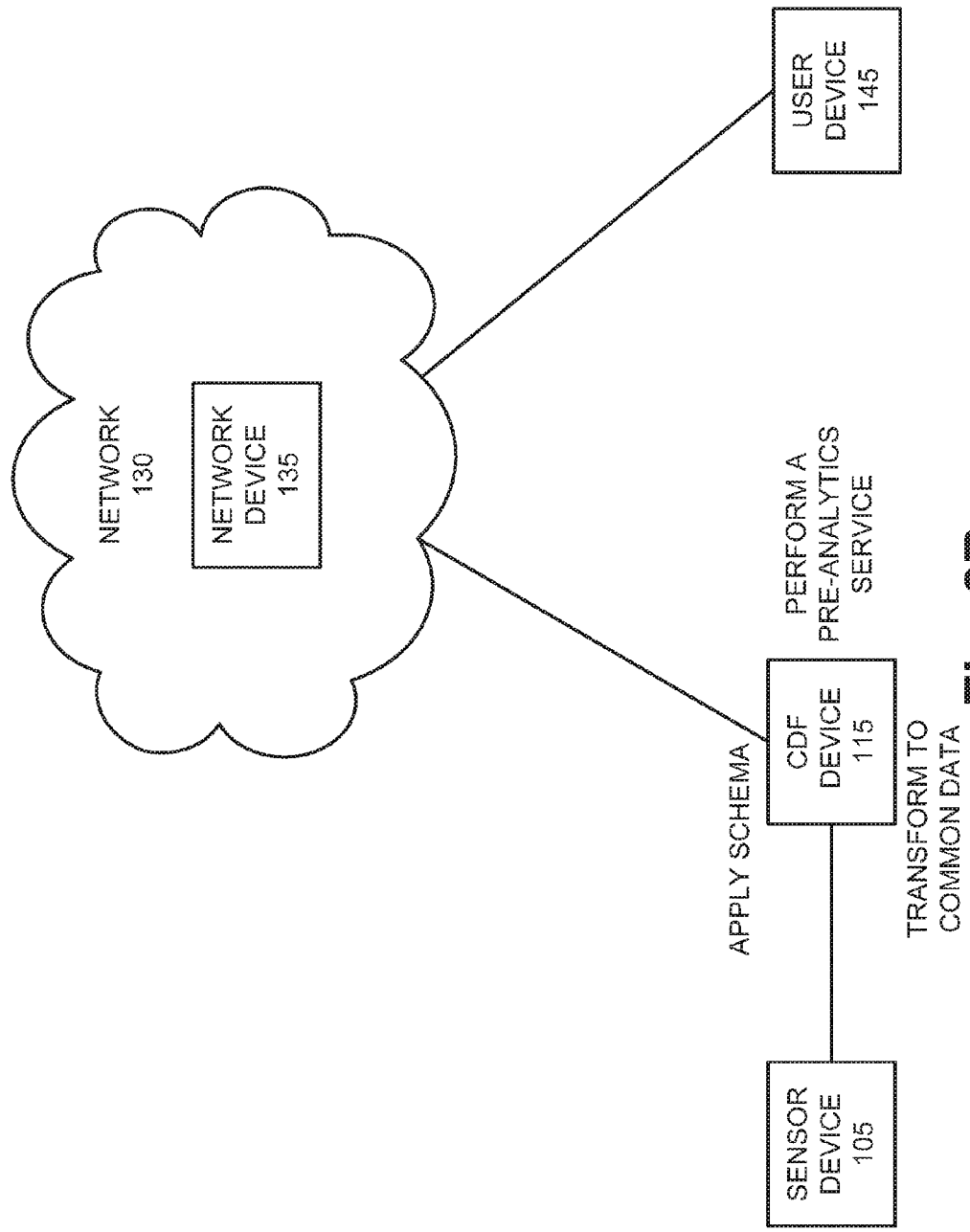

Referring to FIG. 2B, common data format device 115 converts the sensor data into schema data based on a format defined by a schema (e.g., an XML schema). Common data format device 115 transforms the schema data into common data of the common data format. The transformation of the schema data includes adding metadata to the schema data. The metadata supports an ontology representation. As previously described, the metadata may include context data and/or other types of user-configurable types of data (e.g. non-context data, etc.).

As further illustrated, common data format device 115 performs a pre-analytics function. For example, assume the sensor data is health-related (e.g., glucose levels). Common data format device 115 may analyze the sensor data (or the schema data or the common data) to identify whether the sensor data exceeds a threshold value. In the event that common data format device 115 determines that the sensor data exceeds the threshold value, common data format device 115 may perform a user-configurable response (e.g., prioritize the sending of the common data to network device 135, generate an alarm, communicate a command to another device to release insulin, etc.). According to this example, assume that the pre-analytics service determines that the sensor data is within a normal range of glucose values.

Referring to FIG. 2C, common data format device 115 and network device 135 perform security services in relation to the transmission and storage of the common data from common data format device 115 to network device 135. For example, common data format device 115 may establish a secure connection with network device 135, such as a VPN connection. Additionally, common data format device 115 may perform additional security functions (e.g., data integrity checking, encryption) as well as other data processing functions (e.g., compression). For example, in the case of health-related data, common data format device 115 and/or network device 135 performs particular security measures (e.g., in compliance with applicable laws) when transmitting, receiving, and storing the common data. According to other examples of sensor data (e.g., environmental readings, etc.), common data, etc., common data format device 115 may not perform one or more of the security services, as described herein. Although not illustrated, common data format device 115 may transmit other instances of data (e.g., sensor data, schema data, proprietary data, etc.) to network device 135.

Figure 2D:
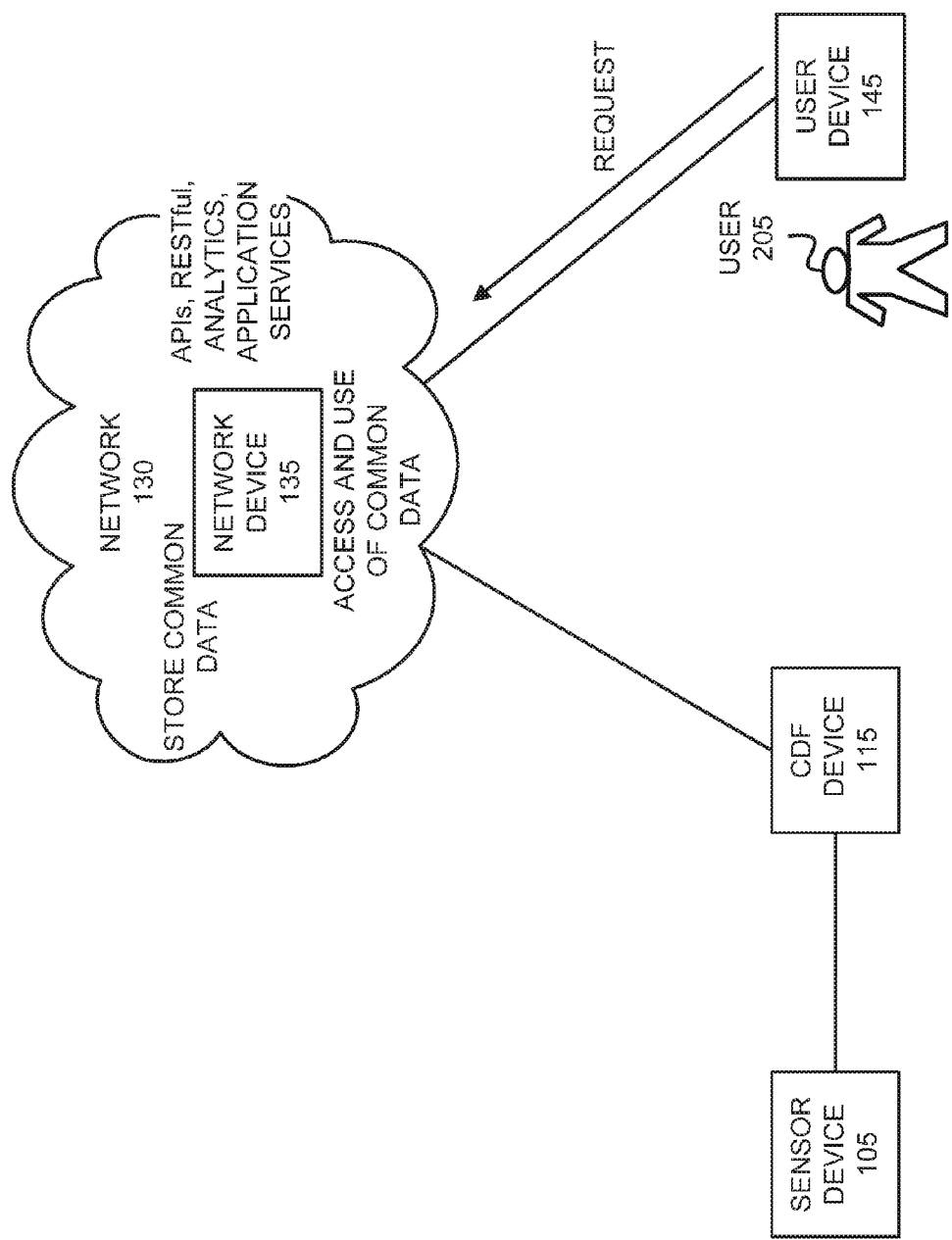

Referring to FIG. 2D, network device 135 stores (e.g., in a database) the common data received from common data format device 115. Network device 135 may store (e.g., in the same or a separate database) other types of data (e.g., sensor data, metadata, etc.) Additionally, network device 135 provides access to use of the common data and, if present, other types of data. For example, as illustrated, network device 135 may provide an application programming interface (API), a Representational State Transfer (REST)ful, analytic, and application services to expose, process, use, analyze, etc., the common data, etc. For example, a user 205 of user device 145 may transmit a request, via user device 145 and to network device 135 for accessing common data. Network device 135 may perform security services, such as authentication and authorization. Upon successfully authenticating and authorizing user 205, user 205 may perform various tasks. For example, user 205 may browse (e.g., a data structure, such as a list, a graph, a tree; a thumbnail (e.g., a still picture); video, etc.) the common data; modify (e.g., correct, add, append, etc.) the common data; create (e.g., store and/or sign a data stub, etc.) data; import/export (e.g., collect, stream, sort, publish, etc.) the common data; audit and triage (e.g., age, prioritize, provenance, assign a monetary cost to access the data by users (e.g., fees, etc.), etc.) the common data; aggregate/disaggregate the common data; de-identify the common data, etc. User 205 may perform the same exemplary tasks with other types of data (e.g., metadata, sensor data, etc.). The APIs and RESTful web services of network device 135 allow the common data, the metadata, etc., to be used by any application (e.g., on a user device, a network server, etc.), as well as provide access to security services (e.g., govern access to data using authentication, authorization, govern access to common data format device 115, etc.). According to an exemplary implementation, a web service may use a Web Services Description Language (WSDL) model.

Figure 2E:
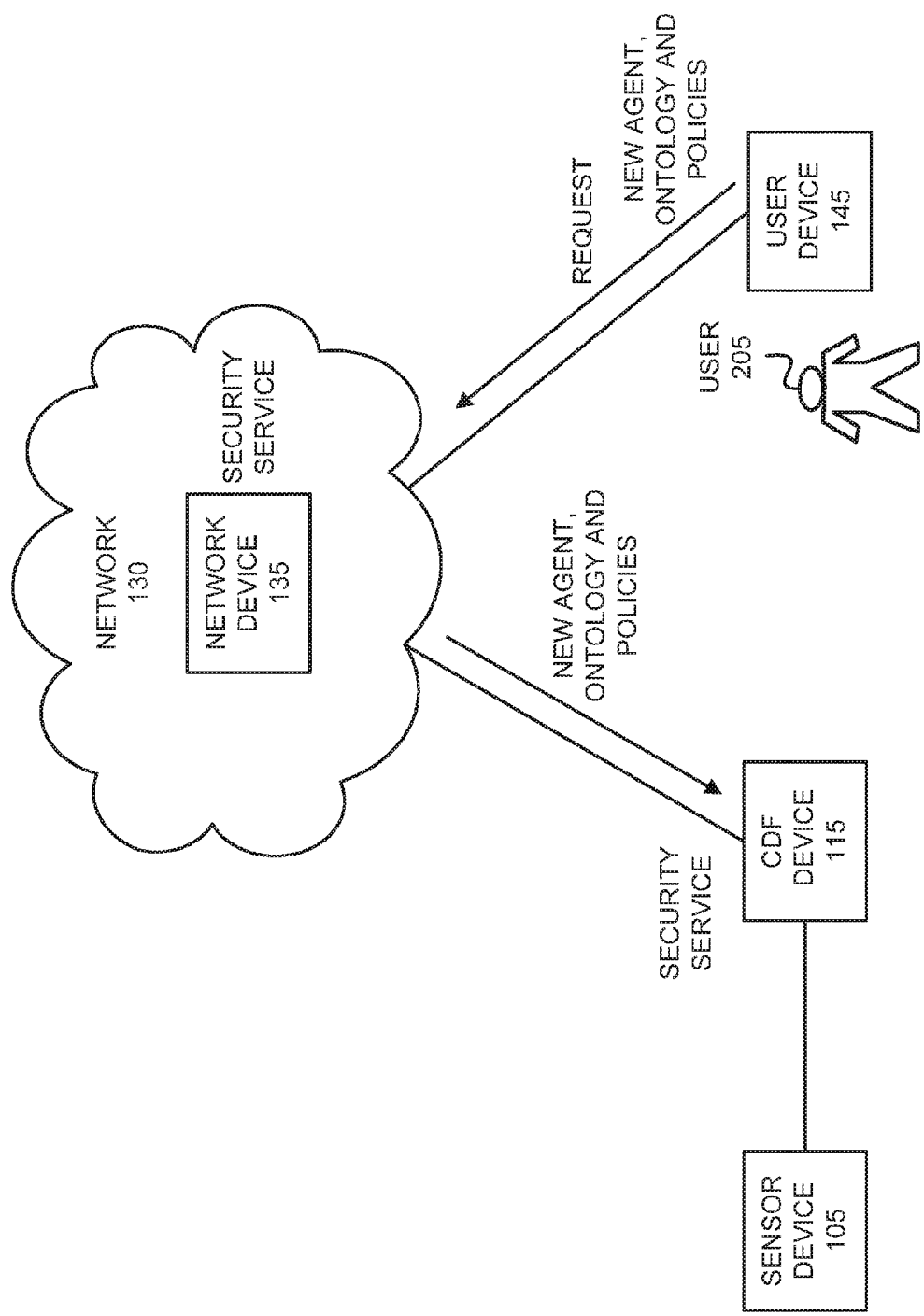

Referring to FIG. 2E, user 205 may configure common data format device 115. For example, user 205 may want to configure common data format device 115 with a new agent, policies, ontology, and/or database. According to an exemplary process, user 205 may transmit a request, via user device 145 and to network device 135, for configuring one or multiple common data format devices 115. Network device 135 performs security services, such as authenticating and authorizing user 205 to configure common data format device 115. User 205 may be granted or denied access and the ability to configure common data format device 115 depending on the outcome the authentication/authorization process. In this example, assume that authentication and authorization are successful. As illustrated, user 205 may configure common data format device 115 with the new agent, policies, ontology, and/or database via network device 135. The new configuration adheres to the common data format. For example, network device 135 may authenticate each common data format device 115 and transmit the new configuration data via a secure connection. In this way, user 205 may selectively configure common data format devices 115 with one or multiple components.

While the above process may be considered a proactive approach to configure common data format device 115, other approaches may be implemented. For example, the configuration of common data format device 115 may be based on a reactive approach. For example, assume the configuration of common data format device 115 is based on location service tied to a user (e.g., a follow-me service). For example, assume a person has a sensor device 105 (e.g., a glucose reader). According to one example, the user may also carry a mobile device (e.g., a smartphone) that is location-aware. The location of the user may be provided to network device 135. In response, network device 135 may configure common data format device 115. For example, if the user travels to the gas station, then to a restaurant, then to a store, and finally back home, network device 135 may configure common data format devices 115 that are located at the gas station, the restaurant, and the store. According to one implementation, after the user leaves a particular location, network device 135 may de-configure common data format device 115. However, at each location, common data format device 115 obtains sensed data (e.g., glucose readings). Common data format device 115 may also provide a pre-analytics service (e.g., compare to a threshold glucose reading value; label the sensed data as "normal", generate an alert to the user via the user's mobile device, etc.). Common data format device 115 may also upload common data to network device 135 using security services, as previously described.

FIG. 3 is a diagram illustrating exemplary components of a device 300 that may correspond to one or more of the devices described herein. For example, device 300 may correspond to common data format device 115, network device 135, and user device 145. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to common data format device 115, software 315 may include an application that, when executed by processor 305, provides the functions as described herein. Additionally, for example, with reference to network device 135, software 315 may include an application that, when executed by processor 305, provides the functions as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4:
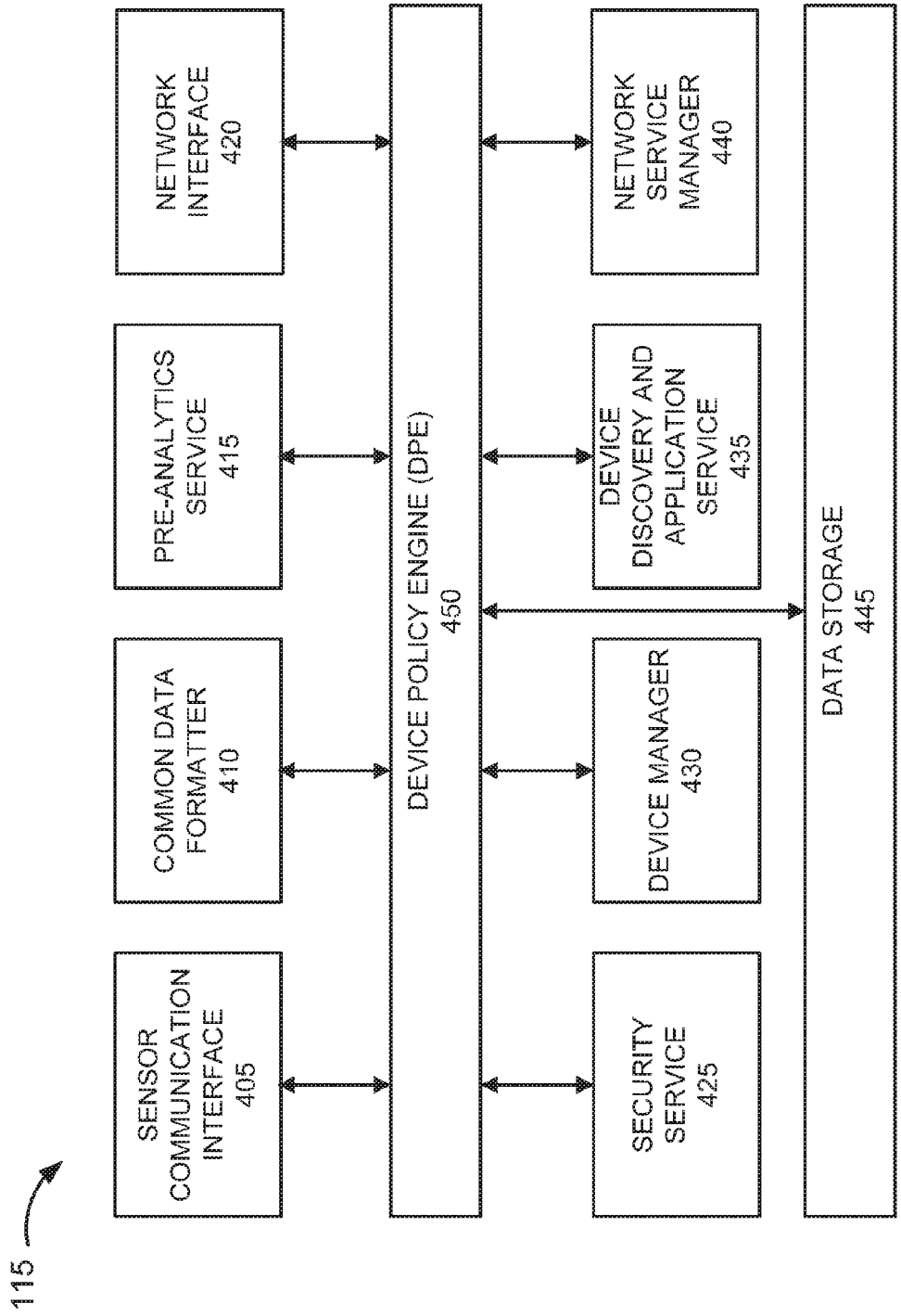
FIG. 4 is a diagram illustrating exemplary functional components of a common data format device.

FIG. 4 is a diagram illustrating exemplary functional components of an exemplary embodiment of common data format device 115. The functional components may be implemented using the components previously described in FIG. 3. As illustrated, common data format device 115 may include a sensor communication interface 405, a common data formatter 410, a pre-analytics service 415, a network interface 420, a security service 425, a device manager 430, a device discovery and application service 435, a network service manager 440, data storage 445, and a device policy engine 450. According to other embodiments, common data format device 115 may include additional, fewer, and/or different functional components than those illustrated in FIG. 4.

Sensor communication interface 405 includes a communication interface capable of communicating with sensor device 105. Senor communication interface 405 includes a transmitter and a receiver, or a transceiver, logic, and protocols which support a communication standard, such as a wireless standard (e.g., WiFi, ZigBee, Ultra Wide Band, etc.) or a wired standard (e.g., IEEE 802.X, etc.). In addition the interface may contain a proprietary communication interface that is capable of communicating with a proprietary non-standard sensor.

Common data formatter 410 includes logic to convert sensor data into schema data, as previously described. Additionally, common data formatter 410 includes logic to convert schema data into common data, as previously described. Pre-analytics service 415 includes logic to provide data processing/analysis with respect to the common data, as well as other instances of data (e.g., sensor data, schema data, video data, etc.), as previously described. Network interface 420 includes a communication interface capable of communicating with network device 135 via network 130. Security service 425 includes logic to provide various security services, such as encryption, decryption, data integrity checking, authentication, authorization, establishment and maintenance of secure connections, etc.

Device manager 430 includes logic to configure common data format device 115. For example, device manager 430 may update or configure various functions (e.g., pre-analytics service 415, common data formatter 410, etc.), data (e.g., a schema, ontology, etc.), policies used by the policy engine, etc. Device discovery and application service 435 includes logic to onboard common data format device 115 into the M2M framework. For example, when common data format device 115 is first turned on, device discovery and application service 435 manages the announcement of common data format device 115 to network 130, sensor devices 105, and initial configurations, etc. Additionally, device discovery and application service 435 includes logic to use a service provided by another device. For example, as previously described, assume common data format device 115 wants to obtain data (e.g., location data) or data pertaining to sensor device 105 (e.g., previous repairs, etc.). Device discovery and application service 435 includes logic to obtain this data from either a third party service or another device in the M2M system.

Network service manager 440 includes logic to manage low level communications (e.g., at least below the application layer) within common data format device 115. Data storage 445 includes a storage device that stores data (e.g., common data, sensor data, schema data, proprietary data, ontologies, etc.). Device policy engine 450 includes logic that manages applications of common data format device 115 based on stored policies. For example, device policy engine 450 may govern what devices common data format device 115 can communicate with, quality of service parameters, time periods of communication, etc., based on various policies. By way of further example, device policy engine 450 may restrict device discovery and application service 435 as to which devices can be used to obtain data. Device policy engine 450 may also manage the activity of other components/applications of common data format device 115.

Figure 5:
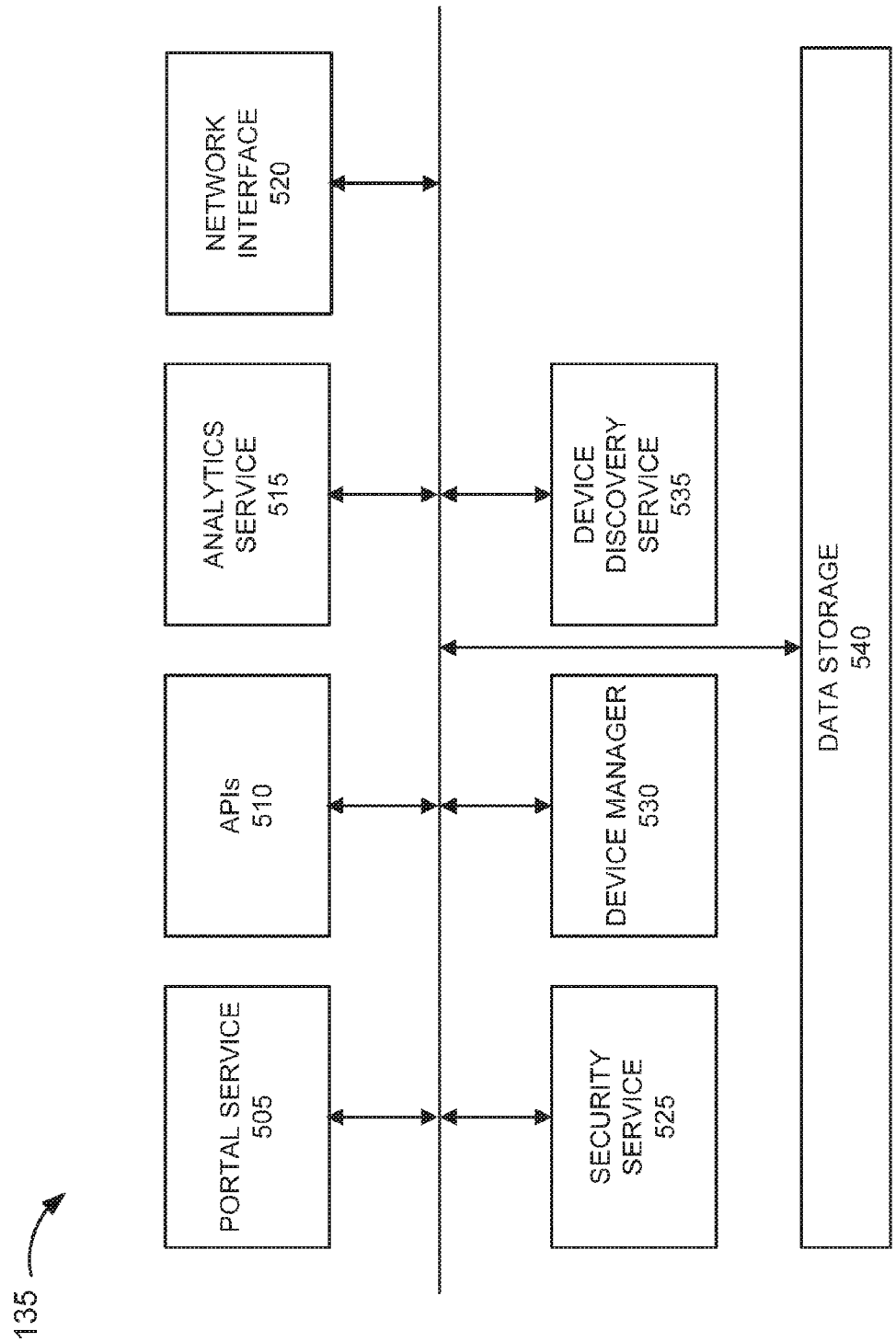
FIG. 5 is a diagram illustrating exemplary functional components of a network device.

FIG. 5 is a diagram illustrating exemplary functional components of an exemplary embodiment of network device 135. The functional components may be implemented using the components previously described in FIG. 3. As illustrated, network device 135 may include a portal service 505, APIs 510, an analytics service 515, a network interface 520, a security service 525, a device manager 530, a device discovery service 535, and data storage 540. According to other embodiments, network device 135 may include additional, fewer, and/or different functional components than those illustrated in FIG. 5. In network 130, one or more of these functional components may be implemented as one or multiple network devices. For example, the network device may be a server device, a database management system, etc.

Portal service 505 includes logic to allow users to access the M2M services. For example, portal service 505 provides user interfaces that allow users to navigate through the available M2M services described herein. Portal service 505 may use/invoke other services (e.g., analytics service 515, security service 525, etc.) and components (e.g., data storage 540, etc.). APIs 510 includes logic to allow third party applications to access and use the data stored in data storage 540.

Analytics service 515 includes logic to provide data processing/analysis with respect to common data, as well as other data (e.g., sensor data, schema data, video data, etc.), as previously described. For example, analytics service 515 includes logic to access, search, modify, create, de-identify, etc., common data, as well as other data.

Network interface 520 includes a communication interface capable of communicating with common data format device 115 via network 130. Security service 525 includes logic to provide various security services, such as encryption, decryption, data integrity checking, authentication, authorization, establishment and maintenance of secure connections, etc. Device manager 530 includes logic to manage the configuration of common data format device 115. For example, device manager 430 may manage the updating or configuring of various functions (e.g., a pre-analytics service, etc.), data (e.g., a schema, ontology, etc.), policies used by the policy engine, etc., in response to user requests, via portal service 505. Device manager 530 may cooperatively operate with device manager 430 to configure common data format device 115. Device discovery service 535 includes logic to onboard common data format device 115 into the M2M framework. For example, when common data format device 115 is first turned on, device discovery service 535 receives announcements from common data format device 115 and sensor devices 105. Device discovery service 535 may cooperatively operate with device discovery and application service 435 to establish initial configuration settings, etc.

Data storage 540 includes a storage device that stores data (e.g., common data, sensor data, schema data, proprietary data, an ontology, etc.). Data storage 540 may be implemented as database management system (DBMS) that supports, among other things, a data model, a query language, and controls data access, data integrity, etc., relative to the database. Data of the database may be stored in various types of data structures (e.g., files, records, objects, tables, etc.). In one example, data storage 540 stores metadata of the common data format, which allows multiple distributed storage items, such as multiple instances of data storage 445 that exist at multiple locations, to appear within the context of network device 135 as a single consistent storage device. The metadata of the common data format allows the M2M system (e.g., network device 135 and common data format device 115) the ability for applications to not only synchronize data between separate physical medium such that the data is consistent, replicated and available across multiple applications and physical locations, but also the ability to identify a synchronization state between data storage devices. For example, the synchronization state between network device 135 and common data format device 115 may be in an unbalanced state. By way of further example, in certain instances sensor data may collect within data storage 445 of common data format device 115 and, because of network service interruptions, this sensor data may not be synchronized with data storage 540 of network device 135. In this instance, the metadata of the common data format can be used by common data format device 115 (e.g., pre-analytics service 415) to identify the atomic operations between these data stores (e.g., data storage 445 and data storage 540) in such a way that common data format device 115 is able to detect and react to the synchronization state imbalance. For example, common data format device 115 may alter its processing of the sensor data that still needs to be transmitted to network device 135 in way that may remedy the imbalance existing in the synchronization state. As an example, common data format device 115 may change (e.g., reduce) the resolution of a video stream, change the compression format to reduce the amount of bandwidth needed, etc., to alleviate the imbalance.

Additionally, the metadata of the common data format allows applications to determine the actual storage state of common data once synchronization has begun. For example, a drop-box service may indicate that data is available to a user before the data is actually stored. That is, the drop-box service may indicate the presence of a file on a drive, however, the actual data of the file has yet to be stored and/or is in the process of being stored. Under this framework, applications need to depend and use the drop-box service to identify the storage state of the file. In contrast, the metadata of the common data format provides a way for M2M applications (e.g., pre-analytics service 415 and analytics service 515) to identify and act upon the storage state without the need to rely on a non-native service.

Figure 6A:
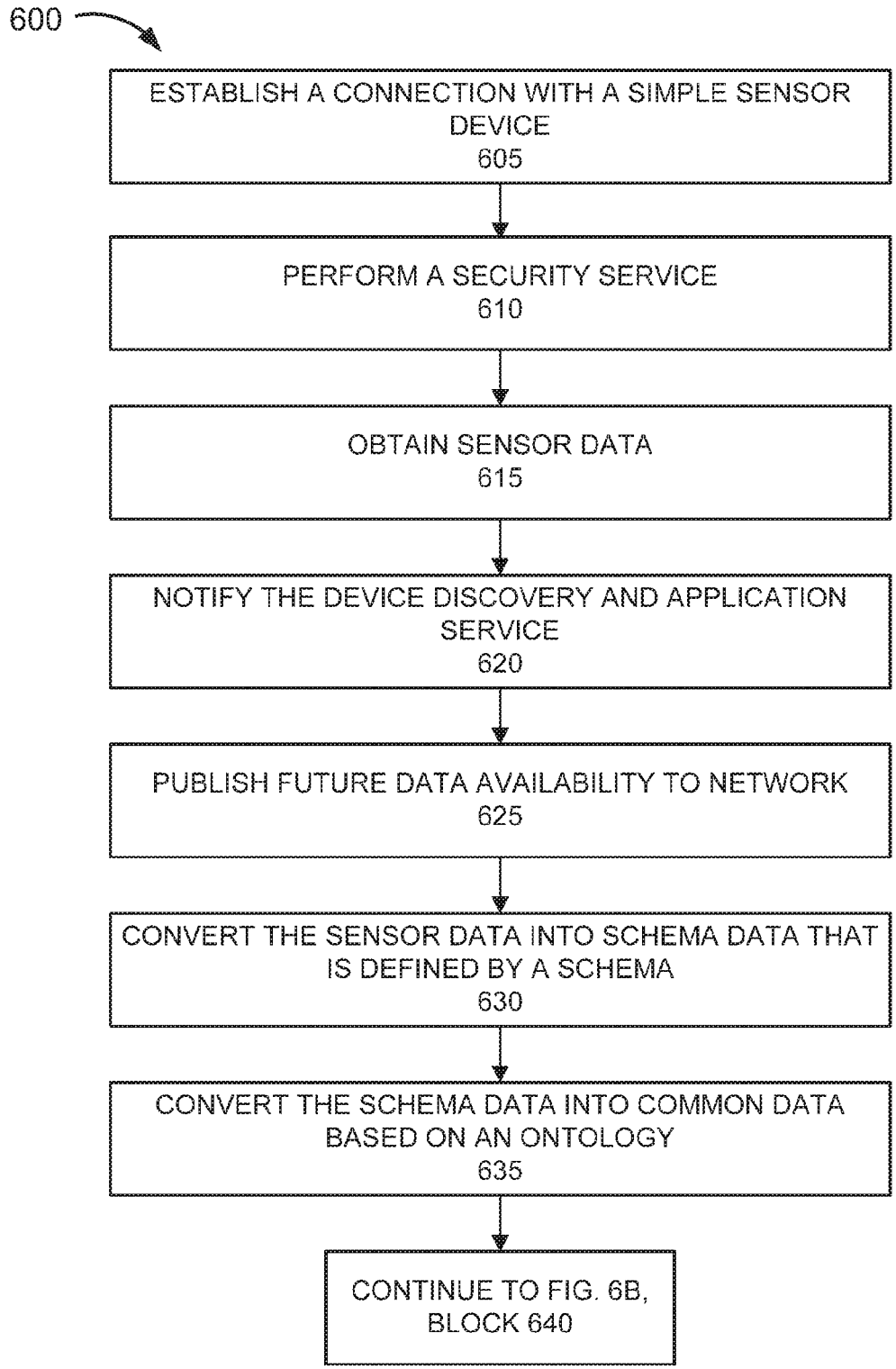
FIGS. 6A and 6B are flow diagrams illustrating an exemplary process pertaining to the M2M service.
Figure 6B:
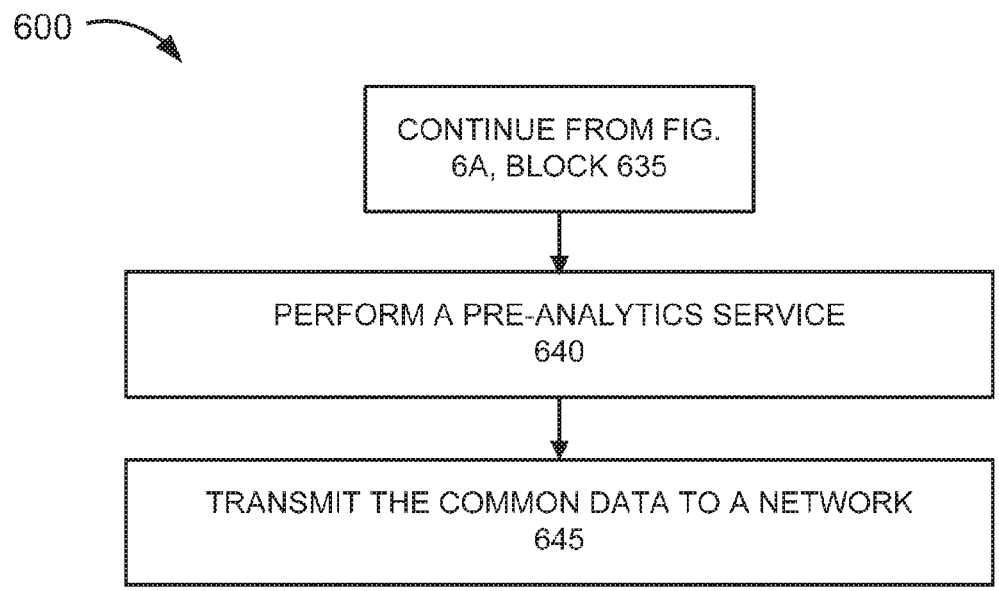

Described below is an exemplary process of the M2M service from the perspective of common data format device 115. FIGS. 6A and 6B are flow diagrams illustrating an exemplary process 600 pertaining to the M2M service. Process 600 is directed to a process previously described above with respect to FIGS. 2A-2C and elsewhere in this description, in which an M2M service includes the common data format. According to an exemplary embodiment, common data format device 115 performs the steps described in process 600. For example, processor 305 may execute software 315 to perform the steps described.

Referring to FIG. 6A, process 600 begins, in block 605, by establishing a connection with a simple sensor device. For example, common data format device 115 establishes a (wireless or wired) communication link with sensor device 105. Common data format device 115 and sensor device 105 may form a local area network, a personal area network, a body area network, or the like.

In block 610, a security service is performed. For example, common data format device 115 authenticates sensor device 105. By way of example, common data format device 115 may use an identifier associated with sensor device 105 and/or some other well-known technique. Upon authenticating sensor device 105, in block 615, sensor data is obtained. For example, common data format device 115 receives sensor data from sensor device 105. The sensor data may be in a proprietary format relative to sensor device 105.

In block 620, the device discovery and application service is notified. For example, a notification is made of the availability of the sensor data to device discovery and application service 435 of common data format device 115.

In block 625, the future availability of the sensor data is published to a network. For example, device discovery and application service 435 of common data format device 115 notifies device discovery service 535 of the availability of the sensor data stored in data storage 445 of common data format device 115. For example, a sensor reading in data storage 445 is announced to network device 135 but is not readily available directly within network device 135 but will be made available per some schedule, which is also part of the common data format. By way of further example, common data format device 115 (e.g., device discovery and application service 435) generates a pre-availability message that indicates the pending availability of data. The pre-availability message may also include the anticipated size of the data, the ontology of the data, the anticipated schedule to transmit the data, etc. Common data format device 115 transmits the pre-availability message to network device 135. Per an event schedule, the data is replicated into data storage 540 according to the needs of analytic services 515 and/or other portal services 505. In addition pre-analytics service 415 of common data format 115 is made aware of the data located within data storage 540 by means of the metadata in data storage 540, in conjunction with device discovery and application service 435 within common data format device 115, such that additional information can be encapsulated within the metadata of the device policy engine 450. This enables, for example, distributed data storage functions across one or more common data format devices 115 within environment 100.

According to an exemplary use case, this notification may occur in the early stage of data acquisition/processing to enable a potential user of the M2M system to anticipate or to mark an interest in the availability of the sensor data (e.g., stored in common data format device 115). Additionally, the potential user may make his/her interest in the sensor data known to network device 135 (e.g., via a request). The M2M service may, in turn, configure the resources of network device 135 to prioritize a transmission of the sensor data, the common data, etc., from data storage 445 to data storage 540.

In block 630, the sensor data is converted into schema data that is defined by a schema. For example, common data format device 115 converts the sensor data into schema data defined by an XML schema. The XML schema may include any user-configurable schema based on the sensor data received and other data (e.g., type of sensor device 105 (e.g., model number, make, manufacturer, etc.); capabilities of sensor device 105 (e.g., precision, accuracy, resolution, etc.); last calibration, sensor life, time in field, historical data relating to sensor device 105 (e.g., past repair, etc.), etc.), which may be stored by common data format device 115 or accessible to common data format device 115 (e.g., hosted by another device). By way of example, the XML schema may include a schema that includes a sensor identifier, a measurement value, and a measurement unit.

In block 635, the schema data is converted into common data based on an ontology. For example, common data format device 115 selects an ontology based on sensor data and/or schema data. By way of further example, common data format device 115 selects the ontology based on a sensor identifier. Common data format device 115 adds metadata that supports the ontology. As an example, the ontology is represented using Resource Description Format (RDF) and Web Ontology Language (OWL). For example, the RDF defines a triple (e.g., subject, predicate, and object) according to an RDF schema. The RDF data may be annotated with semantic metadata using OWL.

Referring to FIG. 6B, in block 640, a pre-analytics service is performed. For example, common data format device 115 includes intelligence to perform a function relative to data (e.g., the common data, the sensor data, the schema data). The function may include analyzing the data, filtering the data, generating an alarm, etc., as previously described.

In block 645, the common data is transmitted to a remote network device via a network. For example, common data format device 115 transmits the common data to network device 135 via network 130. As previously described, common data format device 115 may perform data processing (e.g., compression, etc.), as well as invoke security services (e.g., encrypt, data integrity checking, establishing a secure connection, etc.). After the data has been successfully uploaded to network device 135, network interface 420 publishes a notification to other components within common data format device 115, by means of device policy engine 450, that the data is available in data storage 540 of network device 135. Additionally, in response to the successful transmission and data stored elsewhere, various components within common data format device 115 may release the resources used within common data format device 115. However, common data format device 115 may store all or a portion of the data in data storage 445 for further reference as needed by items within the common data format device 115. For example, the common data format may include a user interest field that indicates an interest in a local copy of the data. According to an exemplary implementation, the user interest field may act as a counter. In this way, when the counter is at a zero value, common data format device 115 may determine not to locally store the data. Process 600 ends.

Although FIGS. 6A and 6B illustrate an exemplary M2M process 600, according to other embodiments, process 600 may include additional operations, fewer operations, and/or different operations than those illustrated in FIGS. 6A and 6B, as described herein. For example, common data format device 115 stores common data, etc., in a database. In this way, in the event that access to network device 135 is not possible, a user and/or an application may have available the common data, the sensor data, the schema data, and other instances of data (e.g., proprietary) relative to a sensor area serviced by sensor device 105. Additionally, since a consistency between data stored at common data format device 115 and network 130 exists due to the common data format, the distributed nature of this framework offers various benefits in terms of service, expansion, application development, etc.

Figure 7:
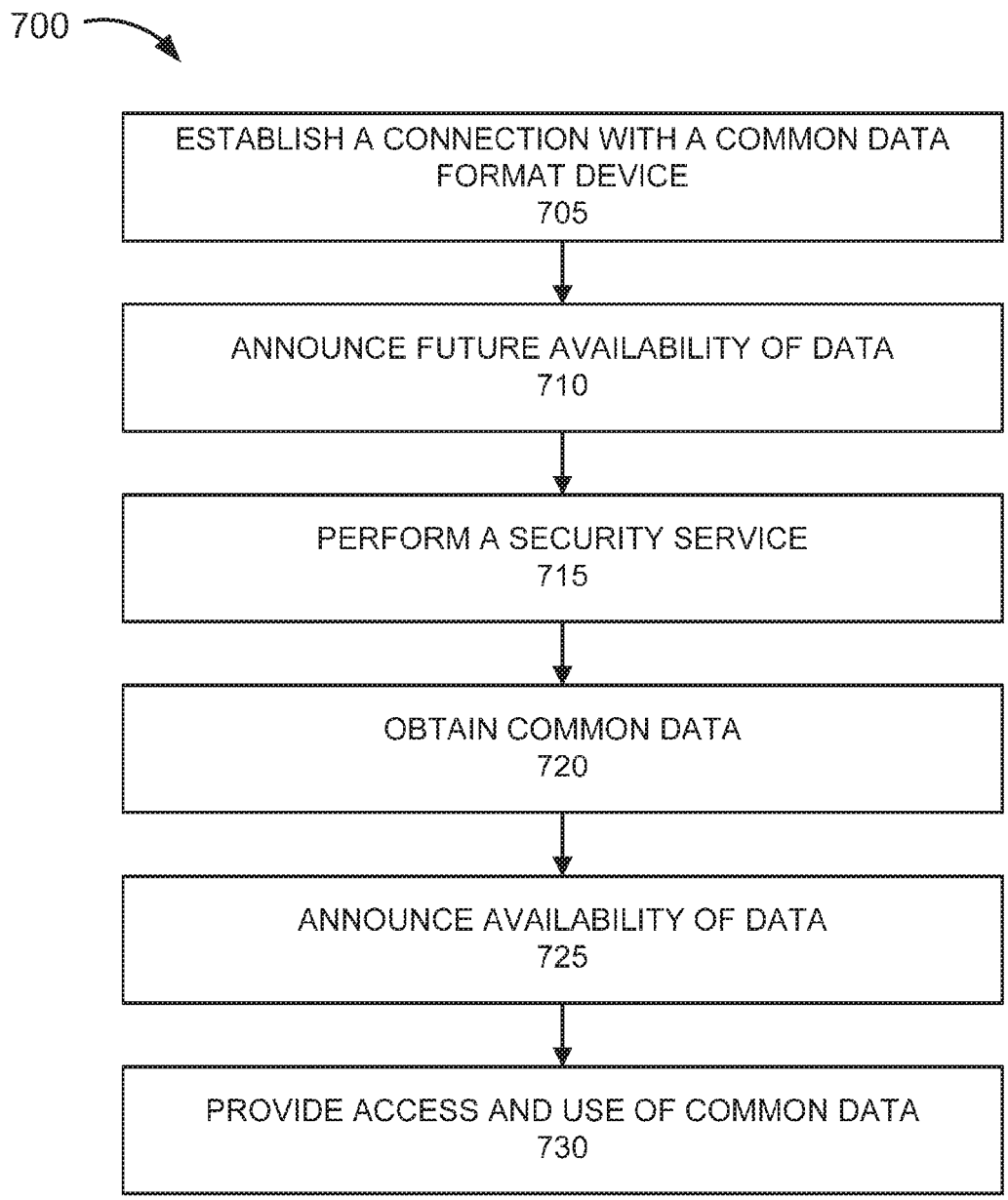
FIG. 7 is a flow diagram that illustrates another exemplary process pertaining to the M2M service.

Described below is an exemplary process of the M2M service from the perspective of the network. FIG. 7 is a flow diagram illustrating another exemplary process 700 pertaining to the M2M service. Process 700 is directed to a process previously described above with respect to FIG. 2D and elsewhere in this description, in which an M2M service stores common data and provides access and use of the common data. According to an exemplary embodiment, network device 135 performs the steps described in process 700. For example, processor 305 may execute software 315 to perform the steps described.

Referring to FIG. 7, process 700 begins, in block 705, by establishing a connection with a common data format device via a network. For example, network device 135 establishes a (wireless or wired) communication link with common data format device 115 via network 130.

In block 710, the availability of data is announced. For example, common data format device 115 notifies network device 135 of new data. In response, network device 135 may notify particular common data format devices 115 of the (future) availability of data (e.g., common data, etc.) in data storage 540.

In block 715, a security service is performed. For example, network device 135 authenticates common data format device 115. By way of example, common data format device 115 may use an identifier associated with common data format device 115 and/or some other well-known technique.

In block 720, common data is obtained. For example, network device 135 obtains and stores the common data in a database. Depending on what the common data pertains (e.g., health-related, energy-related, etc.), the database may constitute a "regulated" database (e.g., health-related, etc.), in which federal and/or state laws may be applicable, or an "unregulated" database. As previously described, network device 135 includes a database management system (DBMS).

In block 725, the availability of the data is announced. For example, in response to storing the common data, network device 135 announces the presence of the common data in data storage 540. Analytics service 515 of network device 135 may choose to use common data stored in data storage 540 and/or common data stored in data storage 445. According to an exemplary implementation, the common data previously stored in common data format device 115 may be deleted once the common data is stored in network device 135. According to such an implementation, the M2M service of common data format device 115 may need to be configured to preserve the common data at common data format device 115 when an interest field pertaining to the common data has an interest value that is non-zero.

In block 730, access and use of the common data is provided. For example, as previously described, network device 135 includes an application that provides data processing and analytics services. For example, network device 135 allows for access to the common data, allow for browsing, searching/querying of common data, data processing (e.g., modify data, classify data, etc.), and data analytics (e.g., interpret sensed data, common data, generate reports, etc.). Additionally, as previously described, the APIs and RESTful web services of network device 135 allow the common data, the metadata, etc., to be used by any application (e.g., on a user device, a network server, etc.), as well as provide access to security services.

Although FIG. 7 illustrates an exemplary M2M process 700, according to other embodiments, process 700 may include additional operations, fewer operations, and/or different operations than those illustrated in FIG. 7 and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 6A, 6B, and 7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   storing, by a device, multiple ontologies;
   establishing, by the device, a connection with a sensor device;
   receiving, by the device, sensor data from the sensor device via the connection;
   selecting, by the device, an ontology from the multiple ontologies based on the sensor data;
   converting, by the device, the sensor data into common data of a common data format, based on the selecting, wherein the common data includes metadata that supports the ontology;
   storing, by the device, the common data; and
   transmitting, by the device, the common data to a network device of a network.

2. The method of claim 1, wherein the sensor data is in a proprietary format, and the device is a gateway device that is local to the sensor device and forms with the sensor device at least one of a local area network or a body area network.

3. The method of claim 1, wherein the converting comprises:
   converting the sensor data into schema data according to a pre-defined schema; and
   adding the metadata to the schema data to form the common data.

4. The method of claim 1, wherein the metadata includes context information that indicates a state of synchronization and a state of storage between the device and the network device.

5. The method of claim 1, further comprising:
   authenticating, by the device, the sensor device; and
   notifying, by the device and to the network device, in response to receiving the sensor data, wherein the network device is notified of a future availability of the common data, and wherein the metadata indicates a prospective interest in the common data by at least one of a user or an analytics service.

6. The method of claim 1, further comprising:
   analyzing, by the device, at least one of the sensor data or the common data; and
   outputting, by the device, a response to the analyzing.

7. The method of claim 6, wherein the analyzing further comprises:
   comparing the at least one of the sensor data or the common data to a threshold value; and
   determining whether the threshold value is satisfied based on the comparing, and wherein outputting the response includes generating an alarm in response to determining that the threshold value is satisfied.

8. The method of claim 1, further comprising:
   establishing, by the device, a secure connection with the network device;

encrypting, by the device, the common data;
receiving, by the network device, the common data; and
allowing access and use of the common data via the network.

9. A device comprising:
a communication interface that includes a transmitter and a receiver, or a transceiver capable of communicating with a sensor device;
a memory, wherein the memory stores instructions; and
a processor, wherein the processor executes the instructions to:
store multiple ontologies;
establish, via the communication interface, a connection with the sensor device;
receive, via the communication interface, sensor data from the sensor device via the connection;
select an ontology from the multiple ontologies based on the sensor data;
convert the sensor data into common data of a common data format based on the selection of the ontology, wherein the common data includes metadata that supports the ontology;
store the common data; and
transmit, via the communication interface, the common data to a network device via a network.

10. The device of claim 9, wherein the sensor data is in a proprietary format, and the device is a gateway device that is local to the sensor device and forms with the sensor device at least one of a local area network or a body area network.

11. The device of claim 9, wherein the processor further executes the instructions to:
compare at least one of the sensor data or the common data to a threshold value;
determine whether the threshold value is satisfied based on the comparison; and
output a response that indicates the threshold value is satisfied in response to a determination that the threshold value is satisfied.

12. The device of claim 9, wherein the processor further executes the instructions to:
authenticate the sensor device;
convert the sensor data into schema data according to a pre-defined schema; and
add the metadata to the schema data to form the common data.

13. The device of claim 9, wherein the device comprises a mobile device.

14. The device of claim 9, wherein, when transmitting, the processor further executes the instructions to:
establish, via the communication interface, a secure connection with the network device; and
encrypt the common data based on a type of the common data.

15. The device of claim 9, wherein the processor further executes the instructions to:
receive, via the communication interface, a message from the network device to configure the device to another one of the multiple ontologies, wherein the message is based on a follow-me service; and
configure the device to the other one of the multiple ontologies in response to the receipt of the message.

16. A non-transitory storage medium storing instructions executable by a computational device to:
store multiple ontologies;
establish a connection with a sensor device;
receive sensor data from the sensor device via the connection;
select an ontology from the multiple ontologies based on the sensor data;
convert the sensor data into common data of a common data format based on the selection of the ontology, wherein the common data includes metadata that supports the ontology;
store the common data; and
transmit the common data to a network device via a network.

17. The non-transitory storage medium of claim 16, further storing instructions executable by the computational device to:
convert the sensor data into schema data according to a pre-defined schema; and
add the metadata to the schema data to form the common data.

18. The non-transitory storage medium of claim 17, wherein the sensor data is in a proprietary format, and wherein the instructions to convert the sensor data further comprise instructions executable by the computational device to:
obtain other data pertaining to the sensor device, wherein the other data includes at least one of last calibration data indicating when the sensor device was last calibrated, historical data indicating any past repair of the sensor device, or capabilities data indicating one or more of precision data, accuracy data, or resolution data pertaining to the sensor device; and
convert the sensor data and the other data to the schema data.

19. The non-transitory storage medium of claim 16, further storing instructions executable by the computational device to:
establish a secure connection with the network device; and
encrypt the common data.

20. The non-transitory storage medium of claim 16, further storing instructions executable by the computational device to:
generate a pre-availability message that indicates a pending availability of the common data in response to the receipt of the sensor data; and
transmit the pre-availability message to the network device.

* * * * *